US012674652B2

(12) United States Patent
Iseli et al.

(10) Patent No.: US 12,674,652 B2
(45) Date of Patent: Jul. 7, 2026

(54) TEMPERATURE COMPENSATION FOR MACHINE TOOL

(71) Applicant: HEXAGON INNOVATION HUB GMBH, Heerbrugg (CH)

(72) Inventors: Claudio Iseli, Au (CH); Frank Valpertz, Drolshagen (DE)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 377 days.

(21) Appl. No.: 18/211,079

(22) Filed: Jun. 16, 2023

(65) Prior Publication Data

US 2024/0125584 A1 Apr. 18, 2024

(30) Foreign Application Priority Data

Jun. 20, 2022 (EP) ..................................... 22179835

(51) Int. Cl.
*G01B 5/00* (2006.01)
*B23Q 11/00* (2006.01)
(Continued)

(52) U.S. Cl.
CPC ......... *G01B 5/0014* (2013.01); *G01B 21/045* (2013.01); *G05B 19/404* (2013.01)

(58) Field of Classification Search
CPC .... G01B 5/0014; G01B 21/045; G01B 5/008; G01B 21/042; G05B 19/404;
(Continued)

(56) References Cited

U.S. PATENT DOCUMENTS

| | | | |
|---|---|---|---|
| 7,568,275 B2 | 8/2009 | Jensen | |
| 9,739,606 B2 | 8/2017 | Jonas et al. | |

(Continued)

FOREIGN PATENT DOCUMENTS

| | | |
|---|---|---|
| CN | 101573207 A | 11/2009 |
| CN | 106483928 A | 3/2017 |

(Continued)

OTHER PUBLICATIONS

CN Office Action dated Sep. 17, 2025 as received in Application No. 202310715638.2.
(Continued)

*Primary Examiner* — Brandi N Hopkins
(74) *Attorney, Agent, or Firm* — Maschoff Brennan

(57) ABSTRACT

A machine tool for processing a workpiece having a temperature that deviates from a pre-defined processing temperature, the machine tool comprising a base to position the workpiece on, at least one processing means for processing the workpiece, one or more actuators for moving the processing means relative to the base, a control unit for controlling the actuators, the control unit comprising a data storage for storing nominal data providing nominal dimensions of the workpiece at the pre-defined processing temperature, and at least one temperature sensor that is configured to determine one or more actual temperature values of the workpiece, wherein the at least one temperature sensor is configured to generate temperature data based on the determined actual temperature values and to provide the temperature data to the control unit.

19 Claims, 5 Drawing Sheets

(51) Int. Cl.
  G01B 21/04      (2006.01)
  G05B 19/404      (2006.01)

(58) Field of Classification Search
  CPC ...... G05B 13/024; G05B 19/41; B23Q 15/12;
        B23Q 17/20; B23Q 11/143; B23Q
        15/013; B23Q 15/04; B23Q 11/00; B23Q
        17/0995; B23Q 15/02; B23D 47/04; B23F
        1/023; B23K 26/00; B23K 26/38; G01N
        25/72; G01N 25/16; G03F 7/7085; B30B
                15/16; Y02P 90/02
  See application file for complete search history.

(56)              References Cited

U.S. PATENT DOCUMENTS

| | | | |
|---|---|---|---|
| 2006/0218811 A1 | 10/2006 | Sato | |
| 2013/0116851 A1 | 5/2013 | Sasaki et al. | |
| 2016/0124420 A1* | 5/2016 | Murahashi ......... | B23Q 11/0007 |
| | | | 700/175 |
| 2021/0039217 A1* | 2/2021 | Izumi ................ | B23Q 17/0985 |

FOREIGN PATENT DOCUMENTS

| | | | |
|---|---|---|---|
| CN | 107775445 A | 3/2018 | |
| CN | 108 296 877 A | 7/2018 | |
| DE | 11 2006 000 774 B4 | 9/2013 | |
| EP | 546 784 A2 | 6/1993 | |
| EP | 1 128 156 A1 | 8/2001 | |

OTHER PUBLICATIONS

Schmitt, R.H. et al., "Advances in Large-Scale Metrology—Review and future trends," CIRP Annals—Manufacturing Technology, vol. 65, pp. 643-665 (2016).
Extended European Search Report dated Nov. 30, 2022 as received in Application No. 22179835.8.

* cited by examiner

25
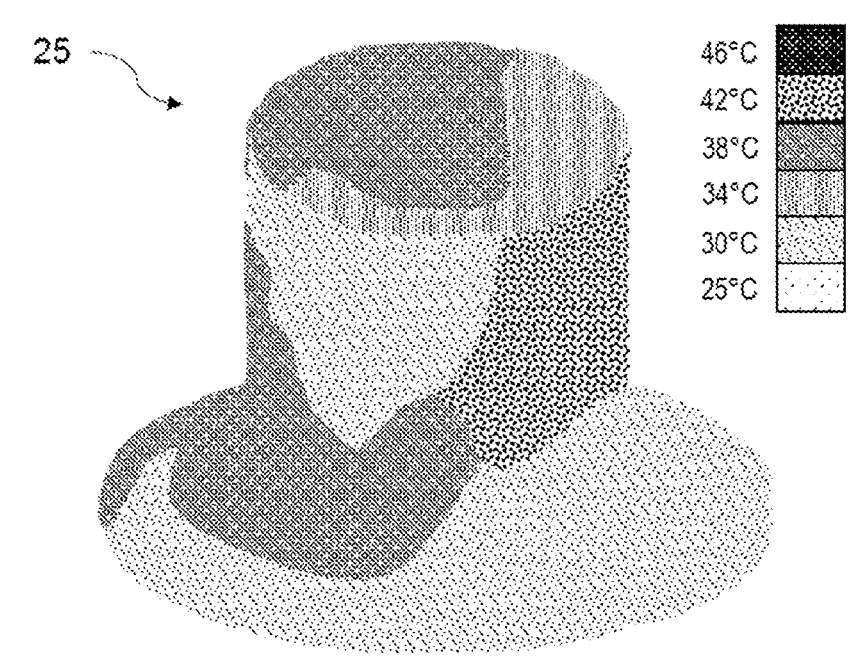
| | |
|---|---|
| 46°C | |
| 42°C | |
| 38°C | |
| 34°C | |
| 30°C | |
| 25°C | |
Fig. 3
26
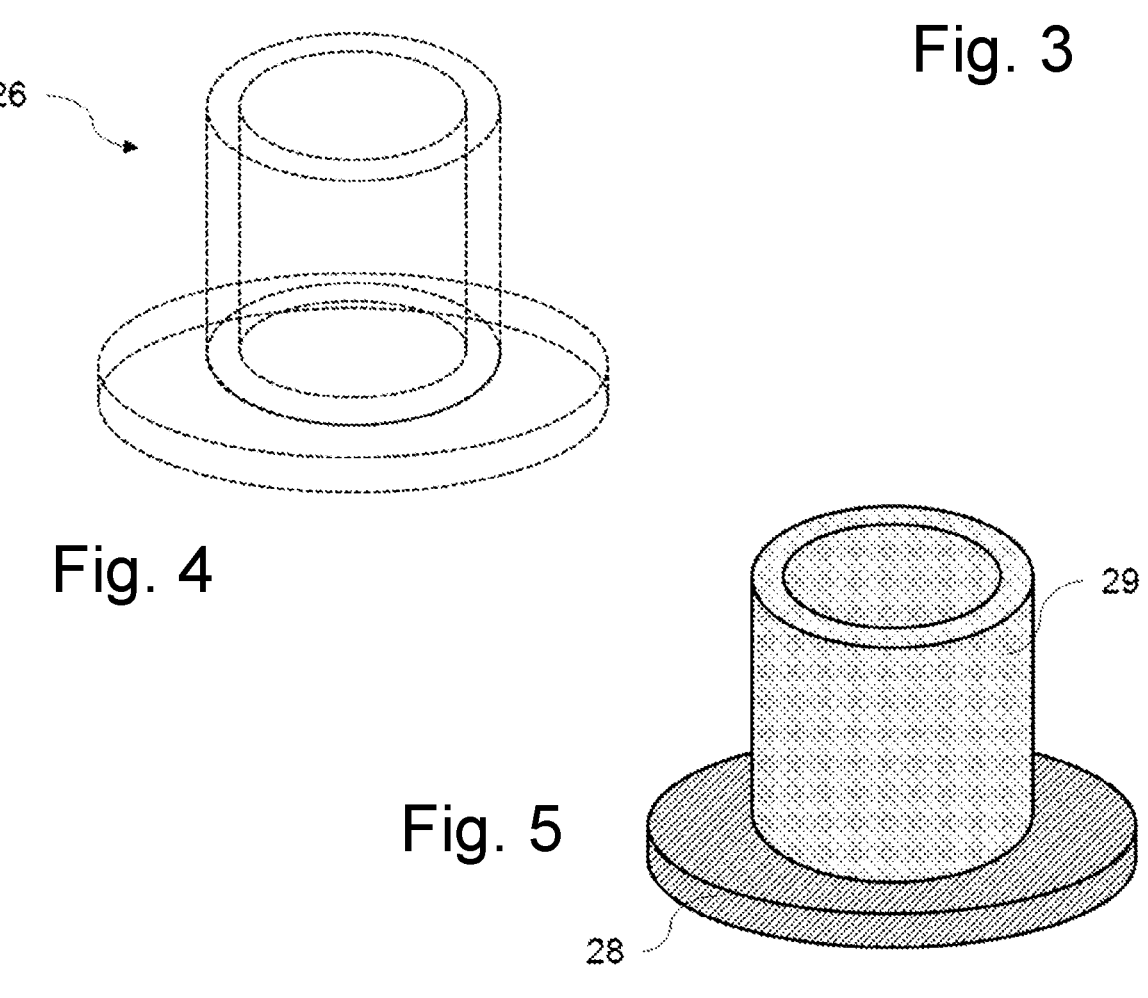
Fig. 4
Fig. 5
29
28

TEMPERATURE COMPENSATION FOR MACHINE TOOL

BACKGROUND

The present disclosure generally pertains to a system for processing or manufacturing a workpiece. The system comprises a machine, e.g. embodied as a machine tool such as a CNC machine, one or more temperature sensors for determining temperatures of the workpiece and a thermal compensation functionality that allows compensating temperature-induced distortions of the machined and measured object and/or predicting dimensions of the same object at a pre-defined temperature.

Various types of machine tools, including CNC (Computerized Numerical Control) machines, may be used for processing and manufacturing various parts. During production, workpieces can have an inhomogeneous temperature distribution that also can differ significantly from that of the machine tool and its surroundings. Also, the temperature distribution changes over time and is also dependent on the type of fixation. For instance, basically identical workpieces that are to be processed by a machine tool can have different temperature distributions, due to different storage or transport conditions or distinct process influences at the machine tool or during previous processing steps. Moreover, these temperature distributions usually differ from the nominal conditions of the workpiece design. In most cases, the design envisages a homogeneous temperature distribution with a "normal temperature" of, e.g., 20° C.

Deviations from this homogeneous normal temperature influence dimensions of the workpiece due to temperature-influence including local or overall deformations (e.g. expansions). Conventionally, in order to eliminate this influence, workpieces may be tempered to the pre-defined normal temperature. Local workpiece expansions due to the influence of temperature are thus eliminated during processing or manufacturing by a machine tool. However, this conventional approach has the disadvantage of a long waiting time until the temperatures in the workpiece are equalized to the normal temperature. This adjustment time depends, amongst other things, on the initial temperatures in the workpiece and on the heat inertia of the workpiece—or of different heat inertias due to different materials used for different parts of the workpiece. Since tempering a workpiece may thus take a long time before a measurement or machining step can be made, it would be desirable to reduce the waiting time and thus the overall time for producing a workpiece.

If the temperature expansion state of a workpiece would be known, tempering the workpiece would not be necessary. Then, during production, for each point on the workpiece, the temperature expansion can be taken into account and compensated in the production process, i.e. taking into account the temperature-dependent expansion relative to normal temperature.

Some machine tools follow a different approach, wherein the workpiece is clamped on the machine and a temperature sensor is attached to the workpiece at a defined point or measurements are performed at individual points with a temperature sensor controlled by the machine tool. Using these sensor values, an average value is formed for a specific point in time. The main disadvantage of this method arises from the "homogeneous view" of the workpiece, which—especially if the workpiece consists of more than one material—rarely corresponds to reality. Also, effects from local heat outflow (or inflow) are ignored. Consequently, this form of compensation can only be used for low precision applications. It would be desirable to have a solution which avoids these disadvantages and can be used for producing workpieces with high precision.

An example for a thermal imaging temperature sensor for determining a temperature of a workpiece is disclosed in EP 546 784 A2.

CN 108 296 877 A generally discloses the application of thermal expansion coefficients for machine tools. Temperatures of workpieces are monitored during machining, and actual thermal expansion coefficients are calculated by combining theoretical values and actual detected workpiece sizes. However, this approach does not include internal or residual stresses in the workpiece due to fixation of the workpiece.

U.S. Pat. No. 9,739,606 B2 discloses a CMM for inspecting a multitude of workpieces thereby correcting temperature variations by measuring temperatures of a master piece. This approach has the disadvantages that in order to work, the process needs to be exactly the same for each workpiece and all workpieces need to have exactly the same properties regarding temperature distribution.

SUMMARY

It is therefore an object of the present disclosure to provide an improved machine tool and an improved method for processing a workpiece having a temperature that deviates from a pre-defined processing temperature.

It is another object to provide such a machine tool and method for use with a workpiece that has an inhomogeneous temperature distribution.

It is another object to provide such a machine tool and method that allow determining deformations due to the deviating temperature with high precision.

It is another object to provide such a machine tool and method that allow processing the workpiece with high precision—particularly based on the determined deformations.

It is another object to provide such a machine tool and method that allow taking thermal expansion coefficients of the workpieces into consideration.

A first aspect pertains to a machine tool for processing a workpiece which has a temperature that deviates from a pre-defined processing temperature. The machine tool comprises:

- a base to position the workpiece on;
- at least one processing means for processing the workpiece;
- one or more actuators for moving the processing means relative to the base;
- a control unit for controlling the actuators, the control unit comprising a data storage for storing machine parameters of the machine tool and nominal data of the workpiece, the nominal data comprising nominal dimension data providing nominal dimensions of the workpiece at the pre-defined processing temperature; and
- at least one temperature sensor that is configured to determine one or more actual temperature values of the workpiece, e.g. an actual temperature distribution on at least a part of the workpiece.

The at least one temperature sensor of the machine tool is configured to generate temperature data based on the determined actual temperature values and to provide the temperature data to the control unit. The control unit of the machine tool is configured to calculate actual dimensions of the workpiece based on the nominal dimension data and on the provided temperature data, and configured to control the actuators to process the workpiece according to the calculated actual dimensions.

The machine tool may be embodied as a CNC machine. The processing means may be embodied as a tool or comprise one or more tools for machining the workpiece. For instance, the tools may comprise drills, mills, cutters etc.

The machine tool comprises one or more fixations configured to fix a position and orientation of the workpiece on the base, the machine parameters comprise information about the fixations, the nominal data comprises one or more expansion coefficients of the workpiece, and the control unit is configured to calculate the actual dimensions of the workpiece also based on the expansion coefficients of the workpiece and on the information about the fixations. According to one embodiment of the machine tool, the control unit is configured to determine deformations or internal stresses in the workpiece that result from the fixed position and orientation of the workpiece on the base. In this case the control unit may be further configured to calculate the actual dimensions of the workpiece also based on the determined deformations or internal stresses, respectively.

According to some embodiments of the machine tool, the control unit is configured to calculate the actual dimensions of the workpiece also based on machine temperature data generated based on one or more determined actual temperature values of one or more parts of the machine tool. The one or more parts of the machine tool for instance may include the one or more fixations or comprise one or more specific points at or near the one or more fixations. In one embodiment the at least one temperature sensor is configured to determine the one or more actual temperature values of the one or more parts of the machine tool, to generate the machine temperature data and to provide the machine temperature data to the control unit. In another embodiment the machine tool comprises at least one additional temperature sensor, wherein the at least one additional temperature sensor is configured to determine the one or more actual temperature values of the one or more parts of the machine tool, to generate the machine temperature data and to provide the machine temperature data to the control unit.

According to another embodiment of the machine tool, the information about the fixations comprises one or more expansion coefficients of the fixations, and the control unit is configured to calculate the actual dimensions of the workpiece also based on the expansion coefficients of the fixations.

According to another embodiment of the machine tool, calculating the actual dimensions of the workpiece comprises

- obtaining processing point coordinates of one or more processing points on the workpiece to be approached and processed by the processing means;
- identifying, in a numerical simulation model of the workpiece, one or more neighbouring nodes for each of the one or more processing points;
- determining a node-based displacement vector for each neighbouring node; and
- applying, to each of the one or more processing points, either the node-based displacement vector of one neighbouring node, e.g. of the neighbouring node having the shortest distance to the processing point, or an interpolated displacement vector calculated from the node-based displacement vectors of a plurality of neighbouring nodes, to generate temperature correction information for each of the one or more processing points—the temperature correction information for instance comprising temperature-corrected 3D coordinates.

In one embodiment, controlling the actuators to process the workpiece according to the calculated actual dimensions comprises correcting 3D coordinates of the one or more processing points.

In another embodiment, determining the node-based displacement vector comprises using a numerical temperature simulation to calculate a thermal expansion value for a difference between the pre-defined temperature and one or more actual temperatures, e.g. using a Nastran analysis.

In another embodiment, identifying the neighbouring node for each of the one or more processing points is based on the plurality of actual temperature values of the workpiece, e.g. on an actual temperature distribution on at least a part of the workpiece.

According to another embodiment of the machine tool, controlling the actuators to process the workpiece comprises controlling the actuators to move the processing means along a processing path according to the nominal data, the control unit is configured to generate a modified processing path for the processing means based on the calculated actual dimensions of the workpiece, and controlling the actuators to process the workpiece according to the calculated actual dimensions comprises controlling the actuators to move the processing means along the modified processing path.

According to some embodiments of the machine tool, the at least one temperature sensor is a thermal imaging temperature sensor that is configured to be directed to the object or to a working volume of the machine tool and to generate the temperature data in the form of one or more thermal images. In this case, the control unit may be configured to generate the modified processing path based on the thermal images.

In one embodiment, the thermal imaging temperature sensor is movable relative to the base. In another embodiment, the thermal imaging temperature sensor is configured to determine the actual temperature values continuously and to generate a plurality of sets of temperature data based on the continuously determined actual temperature values, wherein each set of temperature data is referenced to a position of the processing means.

According to another embodiment of the machine tool, the at least one temperature sensor is configured to determine the actual temperature values continuously and to generate a plurality of sets of temperature data based on the continuously determined actual temperature values, wherein each set of temperature data is provided to the computing device in real time and/or together with a time-stamp. For instance, each set of temperature data may comprise one or more thermal images, and each set of temperature data may be provided to the computing device referenced to a position of the processing means.

According to another embodiment of the machine tool, the at least one temperature sensor is configured to determine the actual temperature values synchronously with a processing of the workpiece, e.g. wherein a modified processing path is generated dynamically while the processing means is moved along the modified processing path.

According to some embodiments, the machine tool comprises a contacting temperature sensor configured to approach and contact surface points of the workpiece to measure a temperature at each of the surface points and to generate contact temperature values for each of the surface points.

In one embodiment the control unit is configured to adjust the temperature data from the at least one temperature sensor using the contact temperature values. In another embodiment the contacting temperature sensor is included in a tactile stylus. In another embodiment the plurality of processing points comprises the plurality of surface points.

According to another embodiment, the machine tool comprises at least one attachable temperature sensor configured to be attached to surface points of the workpiece to measure a temperature at the surface points and to generate contact temperature values for the surface points. In this case, the control unit may be configured to adjust the temperature data from the at least one temperature sensor using the contact temperature values. For instance, the attachable temperature sensor may be connected with the control unit by means of a cable or by means of a wireless data connection.

According to one embodiment, the at least one temperature sensor is configured to determine the one or more actual temperature values of the workpiece by means of infrared measurement, for instance if the at least one temperature sensor is a thermal imaging temperature sensor. The contact temperature values for the surface points may then be used to calibrate or correct the one or more actual temperature values of the workpiece measured by the at least one temperature sensor.

In one embodiment, the surface points are defined for determining an emissivity of the related surface, wherein defining the surface points comprises detecting reflective surfaces on the workpiece using the nominal dimension data, material information of the workpiece and/or the temperature data from the one or more thermal imaging temperature sensor.

In another embodiment, the at least one temperature sensor is configured to move relative to the workpiece while determining one or more actual temperature values of the same surface of the workpiece by means of infrared measurement, and the computing device is configured to determine an emissivity and/or a reflectivity of said surface and to correct, based on the determined emissivity and/or reflectivity, one or more actual temperature values on said surface using the contact temperature values.

A second aspect pertains to a computer-implemented method for processing a workpiece which has a temperature that deviates from a pre-defined processing temperature using a machine tool—for instance the machine tool according to the first aspect. The method comprises:

obtaining nominal data of the workpiece, the nominal data comprising nominal dimension data providing nominal dimensions of the workpiece at the pre-defined processing temperature, determining one or more actual temperature values of the workpiece, e.g. an actual temperature distribution on at least a part of the workpiece, calculating actual dimensions of the workpiece based on the nominal dimension data and on the provided temperature data, and processing the workpiece according to the calculated actual dimensions.

A position and orientation of the workpiece is fixed on a base of the machine tool by means of one or more fixations, the nominal data comprises one or more expansion coefficients of the workpiece, and the actual dimensions of the workpiece are calculated also based on the expansion coefficients of the workpiece and on information about the fixations.

According to one embodiment, the method further comprises determining deformations or internal stresses in the workpiece that result from the fixed position and orientation of the workpiece on the base, wherein the actual dimensions of the workpiece are calculated also based on the determined deformations and/or internal stresses.

According to another embodiment of the method, the information about the fixations comprises one or more expansion coefficients of the fixations, and the actual dimensions of the workpiece are calculated also based on the expansion coefficients of the fixations.

According to another embodiment of the method, calculating the actual dimensions of the workpiece comprises obtaining processing point coordinates of one or more processing points on the workpiece to be approached and processed by processing means of the machine tool, identifying, in a numerical simulation model of the workpiece, one or more neighbouring nodes for each of the one or more processing points, determining a node-based displacement vector for each neighbouring node, and applying, to each of the one or more processing points, either the node-based displacement vector of one neighbouring node, e.g. of the neighbouring node having the shortest distance to the processing point, or an interpolated displacement vector calculated from the node-based displacement vectors of a plurality of neighbouring nodes, to generate temperature correction information for each of the one or more processing points—the temperature correction information e.g. comprising temperature-corrected 3D coordinates.

In one embodiment, calculating the actual dimensions of the workpiece comprises correcting 3D coordinates of the one or more processing points.

In another embodiment, determining the node-based displacement vector comprises using a numerical temperature simulation to calculate a thermal expansion value for a difference between the pre-defined temperature and one or more actual temperatures, e.g. using a Nastran analysis.

In one embodiment, identifying the neighbouring node for each of the one or more processing points is based on the plurality of actual temperature values of the workpiece, for instance on an actual temperature distribution on at least a part of the workpiece.

A third aspect pertains to a computer programme product comprising programme code which is stored on a machine-readable medium, or being embodied by an electromagnetic wave comprising a programme code segment, and having computer-executable instructions for performing, particularly when executed on a control unit of a machine tool according to the first aspect, the method according to the second aspect.

BRIEF DESCRIPTION OF THE DRAWINGS

The disclosure will be described in detail by referring to exemplary embodiments that are accompanied by figures, in which:

FIG. 3 shows an exemplary thermal image of the workpiece of FIG. 2;

FIG. 4 shows nominal dimensional data of the workpiece;

FIG. 5 shows the workpiece being composed of different materials, each material having a different expansion coefficient;

DETAILED DESCRIPTION

Figures 1A, 1B:
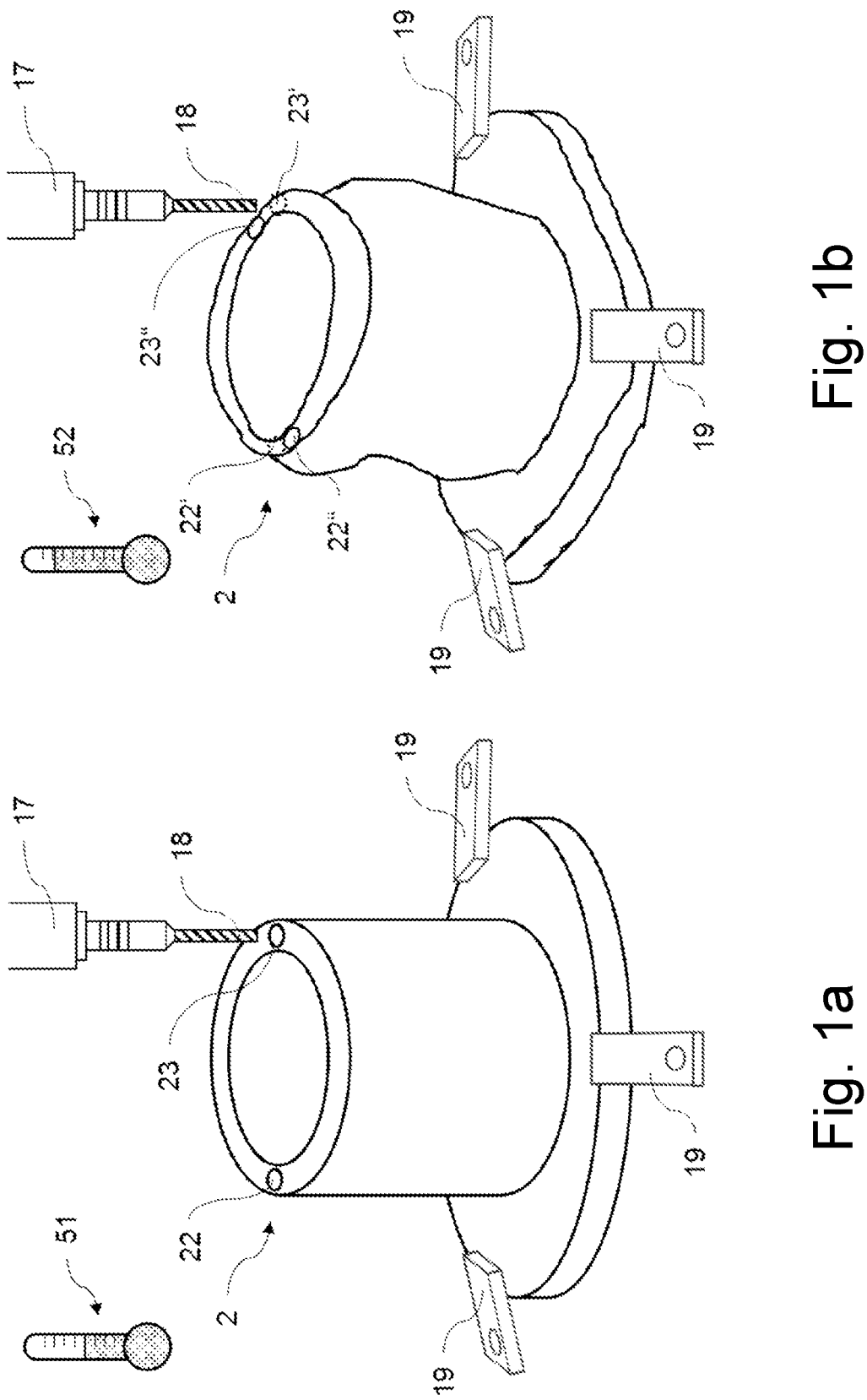
FIG. 1a shows an exemplary workpiece being processed by a tool, the workpiece having a uniform temperature that a pre-defined temperature.
FIG. 1b shows the workpiece of FIG. 1a having a temperature that deviates from the pre-defined temperature and being deformed due to the deviation.

FIGS. 1a and 1b show a workpiece 2 being fixed by means of three fixtures 19 to the base of a machine and being processed by means of a tool 18 of the machine attached to a working part 17 of the machine.

The working part 17 is movable relative to the workpiece 2 to approach tooling points on the workpiece 2 at which a processing operation is to be performed using the tool 18. In the shown example, the tool is a drill that is used to drill two holes into the workpiece 2 at positions 22, 23 that are pre-defined by nominal data of the workpiece. The described configurations can be used in combination with any processing machine and tooling method that use nominal 3D coordinates of an object, e.g. CNC machines and methods.

The fixation enhances the processing accuracy and is advantageous where highly precise production is required. However, depending on the type and material of the fixations, these may strongly influence the temperature development of the workpiece 2, particularly of the sections or components at which the workpiece is fixed.

In FIG. 1a, the workpiece 2 is measured at a first temperature 51, which is a "normal temperature", pre-defined by the nominal data of the workpiece, in which normal temperature the workpiece 2 has defined nominal dimensions. The normal temperature may be a room temperature, e.g. being defined as 20° C. When the workpiece 2 is processed at this normal temperature 51, the nominal dimensions of the workpiece 2 may be used directly for guiding the tool 18 to the coordinates of the positions 22, 23, in order to drill the holes into the workpiece at these coordinates.

In FIG. 1b, the same workpiece 2 is processed by the same machine, while the workpiece 2 has a second temperature 52 (e.g. a second inhomogeneous temperature field), which deviates from the defined "normal temperature" 51. For instance, the workpiece 2 is still hot from a previous processing step. Due to different thermal expansion coefficient(s) of the materials of the workpiece, the dimensions of the workpiece 2 may differ significantly from those that the same workpiece would have at the normal temperature 51. Also, the temperature distribution may be irregular and patchy, since some parts may cool down faster than others. It should be noted that the deformations of the workpiece 2 shown in FIG. 2b are depicted in an exaggerated manner for means of clarification. Due to these resulting deformations, the real positions 22", 23" on the workpiece 2 deviate from their predefined coordinates 22', 23'. The 3D coordinates of the nominal data thus cannot be used directly to perform the same processing steps as in FIG. 1a, since the produced boreholes would be at a wrong position once the workpiece 2 would have cooled down.

Figure 2:
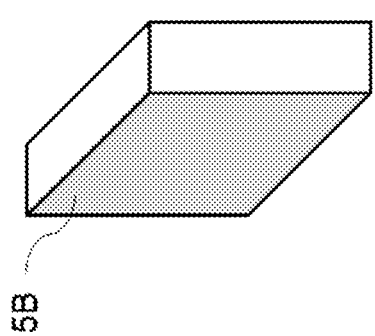
FIG. 2 shows the workpiece of FIG. 1a being fixed to a machine and two thermal imaging temperature sensors measuring temperatures of the workpiece.
Figure 2:
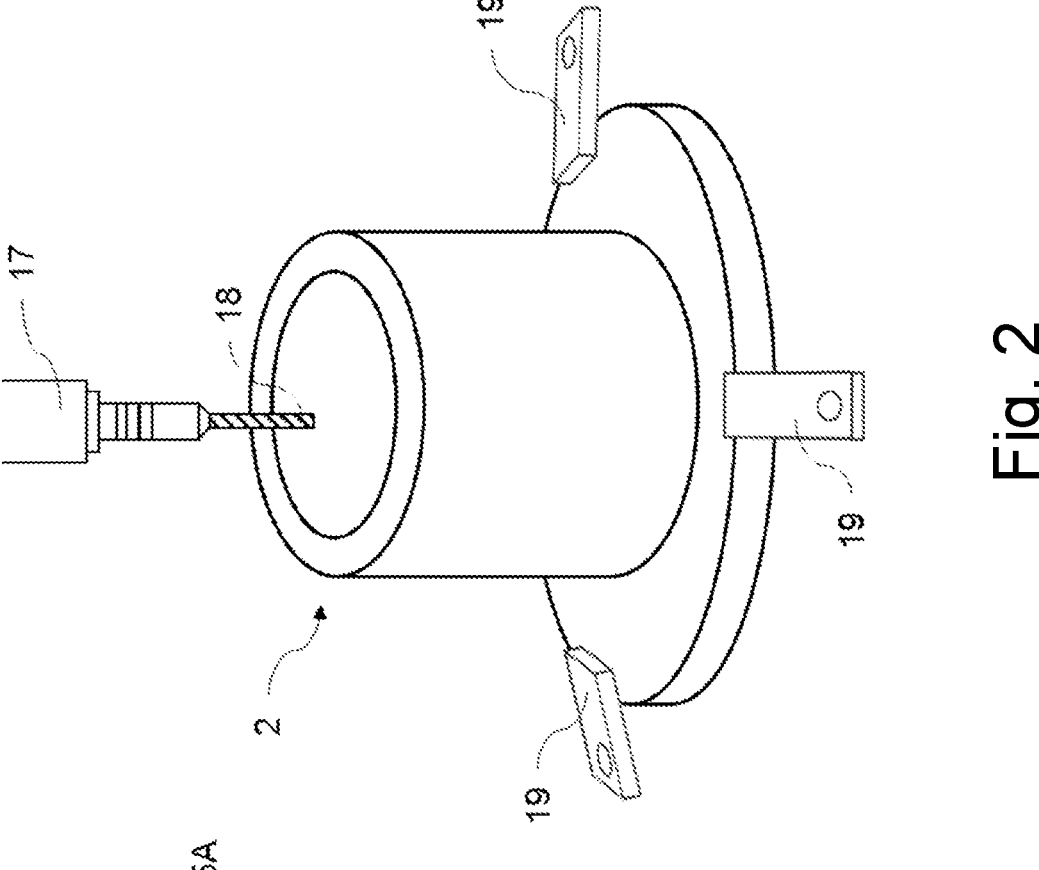
Figure 2:
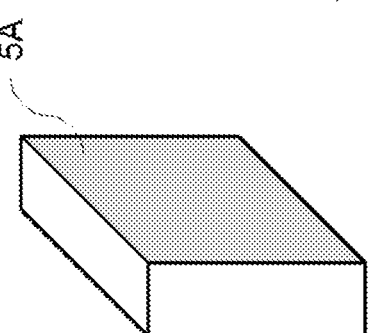

In FIG. 2, two thermal imaging temperature sensors 5A, 5B measure temperatures of the workpiece 2 while it is being processed by the machine of FIGS. 1a and 1b. Temperatures and their distribution on the workpiece 2 are measured continuously and at a multitude of points of the workpiece simultaneously.

Alternatively, the machine may comprise a temperature sensor that is provided on a movable member (leg 12) of the machine and is, thus, movable relative to the base and the workpiece 2 positioned thereon.

The temperature sensors 5A, 5B are embodied as thermal imaging temperature sensors, for instance as thermographic cameras configured to create thermal images using infrared (IR) radiation. For instance, the sensors 5A, 5B may be sensitive to wavelengths from about 1 μm to about 14 μm.

Using computer-aided engineering (CAE), e.g. finite element method (FEM), the known workpiece 2 is virtually meshed, and a virtual model, e.g. an FEM model, is generated. The model comprises all relevant physical information, e.g. temperature distribution (whether homogeneous or discontinuous), material information (thermal expansion coefficient, mass) and other information regarding loadings, e.g. by fixations such as clamping. The user may additionally define relevant material parameters, e.g. the expansion coefficient(s) of the workpiece. Alternatively, information regarding the materials and their 3D distribution in the workpiece 2 may be provided together with CAD data (or other 3D model data) of the workpiece.

The manner in which the workpiece is fixed on the machine and temperature conditions, e.g. expansion coefficients, of the fixtures 19 and the base on which the workpiece is fixed can also be known. The fixation 19 and its heat dissipation or heat addition are defined and determined accordingly. A type and position of the fixation 19 may be determined automatically or provided as a user input. The base and other relevant parts of the machine can also be modelled. The initial temperature distribution of the workpiece and optionally also the initial temperature distribution of the base can be defined in the virtual model.

The deformed state of the workpiece 2 due to the inhomogeneous temperature distribution is determined by transferring the temperature distribution at the measured points to the virtual model. The temperature distribution on the workpiece 2 is then determined by appropriate spatial interpolation at all nodes of the model. Subsequently, a deformation state can be determined using the FEM model and a corresponding solver (e.g. Nastran). A mean temperature of the coordinate measuring device or of its surroundings can be used as the reference temperature. Alternatively, the reference temperature can be a normal temperature defined in the nominal data according to standards or norms of the workpiece or the manufacturing process.

Optionally, initial deformations of the base on which the workpiece 2 is positioned can be determined in the same way. Taking the fixation 19 into account comprises setting corresponding nodes in the models or connecting them to the base. If the base is part of the model, it is assumed that its deformation state defines the nodal points of the fixation or impresses them on the workpiece.

During the processing of the workpiece 2, the temperature status of the workpiece (and optionally the base) is recorded continuously and at several points. These conditions are transferred to the FEM model. The temperature distribution on the workpiece 2 and optionally the base at each node is estimated via spatial interpolation.

Since the fixation 19 is taken into account, the change to the initial state (i.e. shortly before or after fixation) is determined. The changed deformation status due to the temperature change at the beginning and the fixation 19 is subtracted from the initial deformation state and then also returned to the mean machine state or according to standards and norms.

This specific and virtual deformation state can then be used to compensate for processing errors. Thereby, the relevant points on the workpiece 2 in terms of processing may be used. The deformation state is spatially interpolated on these points and subtracted accordingly before the processing. Thus, the processing of the workpiece is performed calculated back to the normal temperature.

If the temperature changes over time, some or all measurements can be repeated periodically. Alternatively, similar measurements can be taken at similar locations. This information, together with the changed temperature values and the specific deformation states over time, enable the simulation to be optimized. Parameters can be adapted, for example the expansion coefficient modelling details of the fixation, so that the estimated changed deformation state better matches the estimated processing states.

Ideally, the improved simulation model can now be used to re-determine all deformation states, including the initial state, and to correct the processing. If this is not possible, the corrected model is used from the respective point in time. The model can then be continuously improved. The more temperature measuring points there are and can be transferred to the model as input, the closer the estimated deformations come to reality. In order to enhance the number of temperature measuring points, it is advantageous to use non-contact temperature measuring methods such as thermal imaging cameras. However, these are dependent on the corresponding workpiece properties, i.e. emission coefficient in the infrared range, and on the environmental influences such as reflections on the surfaces of the workpiece 2.

Non-contact temperature measurements can thus be inaccurate and negatively affect the quality of the deformation state condition. However, the non-contact temperature measurements can be improved autonomously by measuring temperatures at certain points of the workpiece in a standard contacting manner and by contactless temperature measuring at the same points or at similar positions on the workpiece. In this manner, parameters of the contactless measurement can be adjusted in such a way that the above-mentioned influences from the workpiece itself or from the environment are taken into account, so that the contactless measurement provides measurement values with a higher precision. For example, the effective emission coefficient of the workpiece can be determined. The emissivity of a surface depends on the nature of the surface and its material. For instance, rough surfaces have a higher emissivity.

Workpiece surfaces that are prone to temperature reflections due to their reflection properties and/or due to their orientation relative to an external heat source may be identified automatically. Then, contacting temperature measurement can be focused on such surfaces. For instance, metal surfaces of the workpiece 2 may be detected using the nominal 3D data and material information of the workpiece 2, and, workpiece surfaces that are oriented with a critical angle relative to an external heat source may be identified using the orientation of the workpiece 2 and the positions of the known heat sources relative to the machine. Emission, absorption and reflection are interconnected properties of a surface, so that an emission coefficient of a surface can be derived from a detected temperature reflection and vice versa.

Thus, the emissivity of a certain surface can be determined using the contacting temperature measurements. The determined emissivity can then be used to improve (e.g. correct) the infrared temperature measurements, especially if the determined emissivity exceeds a predefined value, typically about 0.6. If the value is smaller (e.g. <0.6), there is generally a risk of measuring temperature reflection of the environment and determining environmental temperature instead of object temperature. In this case, the temperatures measured by means of infrared sensors for such a surface might be ignored instead of corrected.

For instance, such temperature reflections can be identified by moving the thermal image sensor(s) 5A, 5B relative to the workpiece 2 and capturing more than one thermal image of the same surface. If the temperature image changes when the thermal image sensor is moved in relation to the surface, this indicates the presence of reflections. Thus, reflections can be detected and filtered out using such relative movement and a post-processing step, which might also use AI techniques.

The optional contacting temperature measurement may be performed by a special stylus attached to the working part 17 of the machine (e.g. by means of a magnet). Alternatively, attachable temperature sensors may be used.

Alternatively or additionally, methods utilizing artificial intelligence (AI) can help to quickly consider temperature states that deviate from determined states. The local temperature allocation can be carried out using an AI-based evaluation of the thermal images. This may include adapting local emission values or eliminating reflections in the images. The local temperature information obtained is then transferred to a finite element model. An AI system may be trained by simulation results (thermal expansions) for discrete temperature distributions which provide the data basis. Then, an AI can predict simulation results for temperature states that deviate from the trained basis data.

A complete thermal image of the workpiece 2 may be generated by means of a temperature simulation (see FIG. 3). From this, in turn, the temperature-dependent shift image is obtained. Processing points on the workpiece can either be mapped exactly or approximately. Finally, the temperature-related displacement vector is available for all processing points on the workpiece. For all processing points of the measurement, the temperature-related displacement vector is stored in the software of the machine and can be automatically taken into account (i.e. compensated) during the processing.

In some embodiments, only one thermal imaging temperature sensor may be provided. In this case some parts of the workpiece 2 cannot be imaged in a thermal image of the thermal imaging temperature sensor. This problem may be overcome by positioning one or more mirrors with known shapes, positions and poses to capture the otherwise hidden parts of the workpiece 2. Alternatively or additionally, gaps in the temperature distribution data of the workpiece surface may be filled computationally. For instance, this may comprise one or more of the following:

using classical interpolation and extrapolation techniques, e.g. linear, bilinear or cubical;

using look-up tables, e.g. generated from previously performed complete measurements;

using AI models that allow generating a complete image from a reduced input;

using complex FEM models that derive the distribution from an optimization step of the model; or combining AI and FEM models, i.e. using complex FEM simulations to simulate data sets of assumed temperature distributions and to train an AI model that estimates the complete distribution from an incomplete distribution.

Non-contact temperature measurements can be improved by measuring temperatures at certain points of the workpiece in a standard contacting manner and by contactless temperature measuring at the same points or at similar positions on the workpiece. For instance, workpiece surfaces that are prone to temperature reflections due to their reflection properties and/or due to their orientation relative to an external heat source may be equipped with contacting temperature sensors. Alternatively, the contacting temperature measurement may also be performed by a temperature sensor integrated into or provided at the tool 18.

FIG. 3 shows an exemplary thermal image 25 of the workpiece 2 captured by one of the thermal imaging temperature sensors 5A, 5B of FIG. 2 being embodied as a thermographic camera. Each colour (pattern) of the image 25 represents a different temperature. In this example the measured temperatures range from 42° C. to 30° C., thereby deforming different parts of the workpiece in different ways. The higher the resolution of the thermal images 25, the better the resulting deformation can be calculated.

FIG. 4 shows nominal dimensional data 26 of the workpiece, for instance computer-aided design (CAD) data. The nominal dimensional data 26 describes the nominal dimensions of the workpiece at the normal temperature, i.e. the nominal dimensions of a tempered workpiece. According to some embodiments, the nominal data also comprises information about expansion coefficients of the workpiece. In the example of FIG. 5, the workpiece comprises two different materials 28, 29, each having a known expansion coefficient that is provided in the nominal data. It is thus known—at least for a span of likely temperatures—by how much each part of the workpiece expands when having a certain temperature. In combination with the measured temperatures, e.g. from the thermal image 25 of FIG. 3, the expansion coefficients can be used to calculate a deformation of the workpiece relative to its nominal dimensions as provided in the nominal dimensional data 26 of FIG. 5.

Figures 6A, 6B:
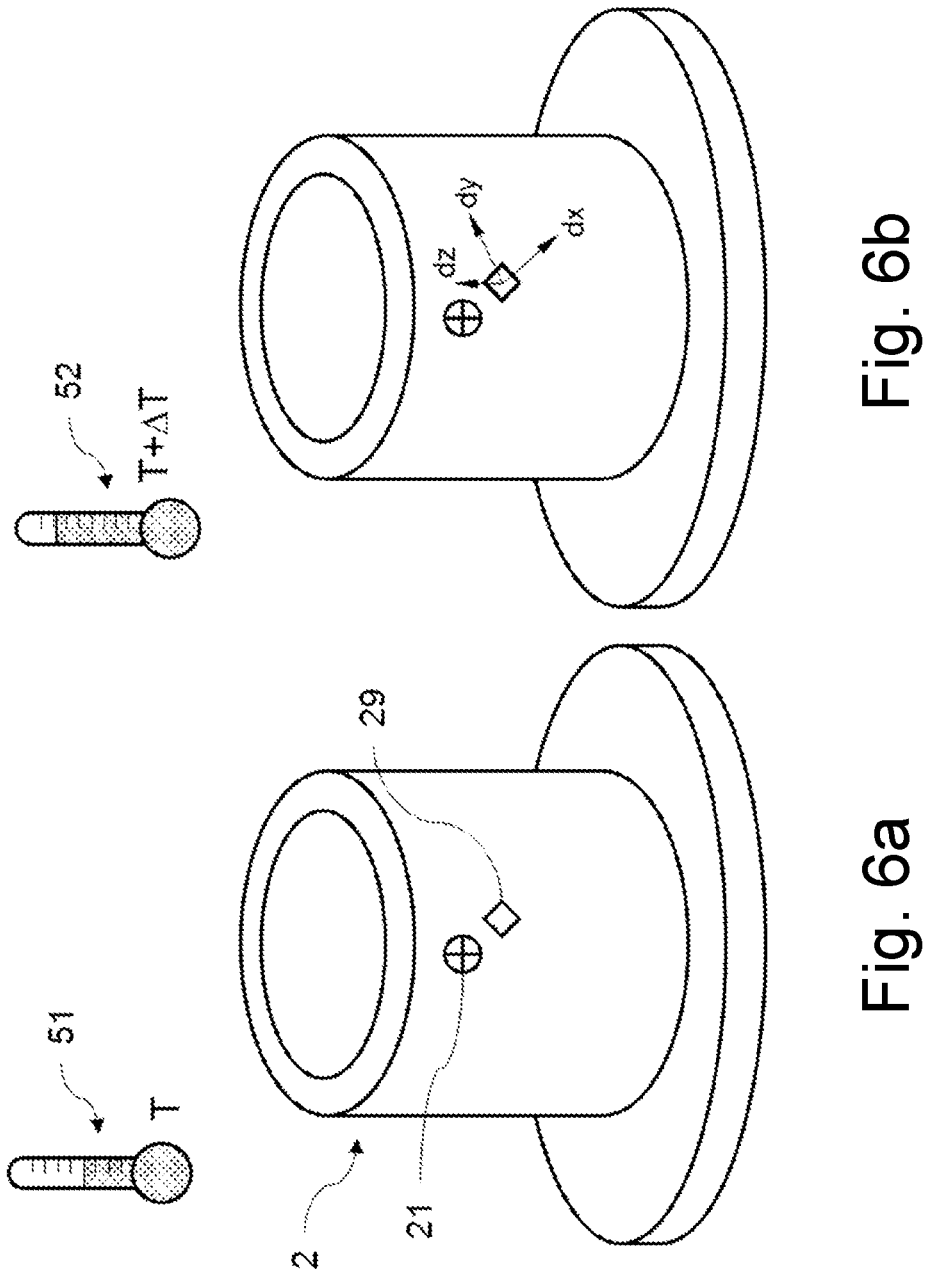
FIGS. 6a and 6b show the use of finite element temperature simulation to calculate elongation values

FIGS. 6a and 6b illustrate the use of a finite-element temperature simulation to calculate elongation values for any temperature difference ΔT between an actual temperature 52 and a pre-defined normal temperature 51. Instead of the illustrated finite-element temperature simulation, also other numeric temperature simulations can be used. A processing point 21 on the workpiece is shown, the processing point 21 being a point at which the machine is expected to perform a tooling action, for instance milling a notch into the workpiece surface, wherefore the machine has to move the respective tool towards the coordinates of the processing point 21.

In FIG. 6a, the workpiece 2 has the normal temperature 51. The processing point 21 reflects the coordinates for the normal temperature 51. The FEM model comprises a multitude of FE nodes, wherein the FE node 29 is the closest to the processing point 21. Preferably, the number of nodes in the FEM model is sufficiently high so that the positional difference between node 29 and processing point 21 is negligible. Each FE node may be assigned a displacement vector for a plurality of temperatures or temperature differences ΔT, e.g. wherein the displacement vector for a temperature difference ΔT of zero (i.e. the normal temperature 51) is zero. These displacement vectors may be provided as a lookup table.

FIG. 6b shows the same workpiece 2 with the same processing point 21 and the same FE node 29. However, the object 2 has an actual temperature 52 that differs from the pre-defined normal temperature 51 (T+ΔT). This temperature difference ΔT causes a displacement vector on the node 29 ($d_x$, $d_y$, $d_z$). Under the assumption that the positional difference between node 29 and processing point 21 is negligible, the same displacement vector is valid for the processing point 21 and can be used to compensate the positioning of the tool. Under the conditions of T+ΔT (i.e. at the temperature 52), the displacement vector caused by ΔT can be subtracted from the nominal value at processing point 21 to get the processing results that would apply at the normal temperature 51.

Figures 7, 8:
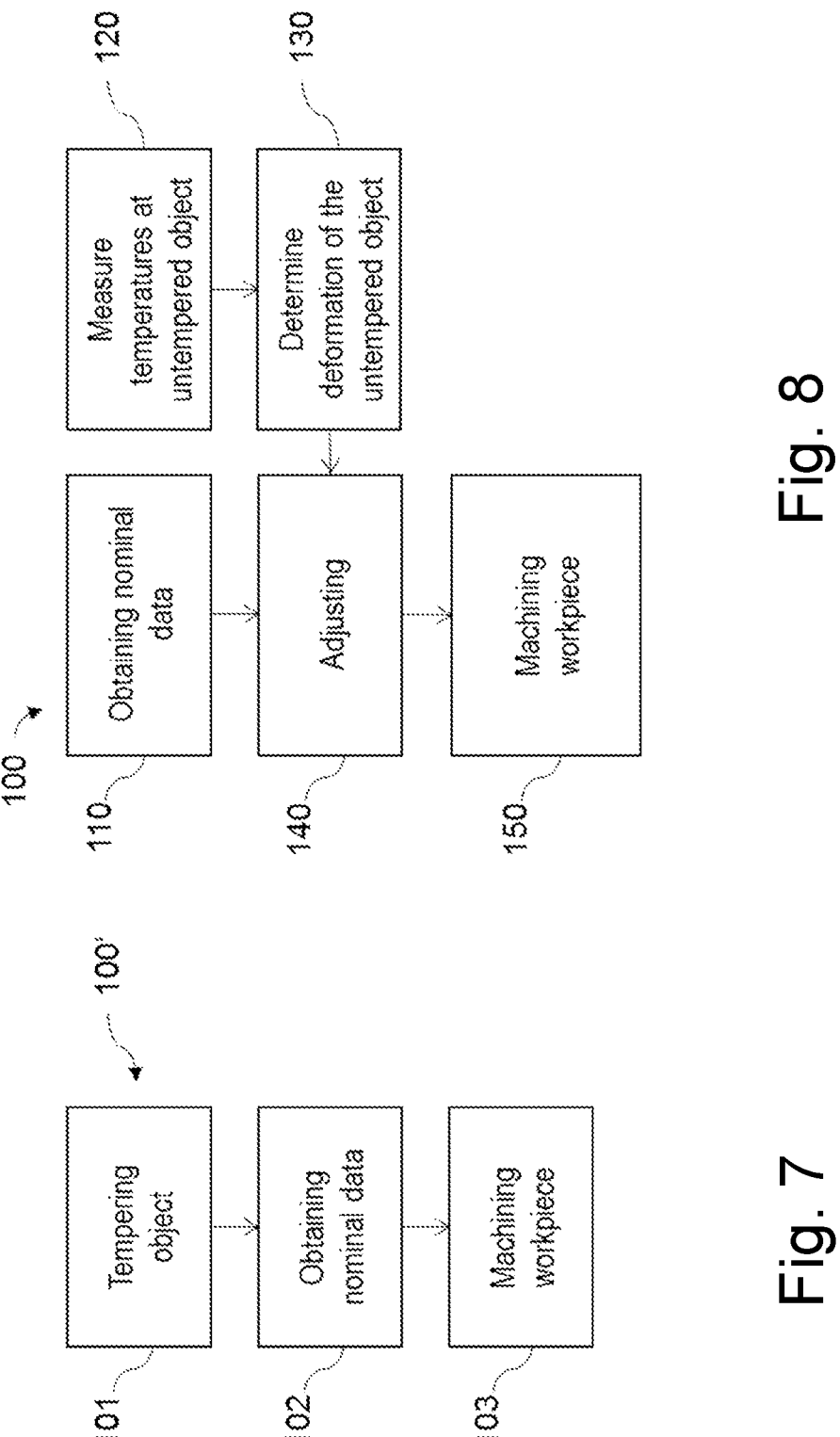
FIG. 7 shows a flow chart illustrating a method known from the art.
FIG. 8 shows a flow chart illustrating an exemplary embodiment of a method.

FIG. 7 shows a flowchart illustrating a prior art method 100' for processing a workpiece. The method starts with tempering 101 the workpiece in order to bring it to the pre-determined "normal temperature" in order to eliminate workpiece deformations due to the influence of temperature. Tempering the workpiece may include storing it in a tempered, e.g. air-conditioned, room having exactly the desired normal temperature, and waiting until the workpiece assumes the surrounding temperature.

When the workpiece has been tempered, it is positioned in a machine—which may also be positioned in the tempered room—and nominal data of the workpiece is obtained 102. The workpiece can then be machined 103 according to the nominal data.

This conventional approach has the disadvantage of a long waiting time until the temperatures in the workpiece are equalized to the normal temperature. This adjustment time depends, amongst other things, on the initial temperatures in the workpiece and on the heat inertia of the workpiece. Since tempering a workpiece may thus take a long time before it can be processed further, it would be desirable to reduce the waiting time.

FIG. 8 shows a flowchart illustrating an exemplary embodiment of a computer-implemented method 100, wherein the step of tempering the workpiece is not needed. Instead, in a first step of the method, nominal data of the workpiece is obtained 110, comprising coordinates of the workpiece and coordinates of the tooling positions—i.e. those positions on the workpiece at which a tool of the machine should perform a tooling action. Since the object may be distorted, these coordinates cannot be used directly. Consequently, a multitude of temperatures of the untempered object are measured 120 by means of one or more thermal imaging temperature sensors. Preferably, these temperature measurements 120 comprise a continuous monitoring of a temperature distribution on the surfaces of the workpiece.

Based on known expansion coefficients of the workpiece (e.g. provided together with the nominal data) and on the measured 120 temperatures, a deformation of the untempered workpiece can be determined 130, i.e. the deformation relative to the form the same workpiece would have if it would have been tempered.

Based on the obtained 3D coordinates and on the determined deformation (or, alternatively, directly on the measured temperatures and expansion coefficients), the 3D coordinates of the tooling positions are adjusted 140. The adjusted coordinates can then be used to machine 150 the workpiece according to design. Thus, the steps 130 and 140 may comprise calculating actual dimensions of the workpiece can be calculated.

The steps 130 and 140 can be performed by an algorithm, which uses as input at least the initially measured temperatures of the object and the distribution of expansion coefficients in the measured object, wherein the distribution of expansion coefficients may be derived from information of a distribution of materials in the measured object and the properties of these materials, including the expansion coefficients.

In one embodiment, using computer-aided engineering (CAE), e.g. finite element method (FEM), the known workpiece is virtually meshed, wherein the user additionally defines relevant material parameters, e.g. the expansion coefficient(s) of the workpiece. The fixation and its heat dissipation or heat addition are defined and determined accordingly. The base and other relevant parts of the machine can also be modelled. The initial temperature state of the workpiece is defined—optionally also the initial temperature state of the base can be defined.

Calculating the actual dimensions of the workpiece optionally may comprise obtaining coordinates of processing points on the workpiece (i.e. points on the workpiece to be approached by a tool of the machine to process the workpiece), to identify one or more neighbouring nodes for each of said processing points in a numerical simulation model of the workpiece, and to determine a displacement vector for each neighbouring node. Then, in order to generate temperature correction information for each of the processing points, to each of them a displacement vector is applied. This displacement vector may be a displacement vector of a neighbouring node, for instance the neighbouring node having the shortest distance to the processing point. Alternatively, the displacement vector may be an interpolated displacement vector that is calculated from the displacement vectors of a plurality of neighbouring nodes. Machining 150 the workpiece includes controlling the actuators of the machine tool to process the workpiece according to the calculated actual dimensions. Optionally, controlling the actuators to may comprise correcting 3D coordinates of processing points.

Controlling the actuators to process the workpiece often comprises moving processing means of the machine tool along a processing path according to nominal data. In these cases, optionally, the control unit may generate a modified processing path for the processing means based on the calculated actual dimensions of the workpiece, so that controlling the actuators to process the workpiece according to the calculated actual dimensions would comprise controlling the actuators to move the processing means along the modified processing path.

Modifying the processing path can be achieved by several ways. For instance, a volumetric compensation that compensates for kinematic imperfections might be adjusted together with the temperature compensation, so that the axes are actuated to move the processing means along the modified processing path. Also, a workpiece offset (e.g. with 6DOF) can be adjusted depending on a program flow. Alternatively, CAD information of the workpiece that serves as an input variable to derive a program flow of the machine tool could be adjusted accordingly. Also, if the relevant features and their parameters are known, the program flow code (e.g. G-code) of the machine could be customized accordingly. Alternatively, set-point modification might be used to adjust path sequences; this might involve interception of set-points from the controller to the axes and adapting them based either on the temperature information or on the determined deformation.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A machine tool for processing a workpiece that has a temperature which deviates from a pre-defined processing temperature, the machine tool comprising:

a base to position the workpiece on;

at least one processing means for processing the workpiece;

one or more actuators for moving the processing means relative to the base;

a control unit for controlling the actuators, the control unit comprising a data storage for storing machine parameters of the machine tool and nominal data of the workpiece, the nominal data comprising nominal dimension data providing nominal dimensions of the workpiece at the pre-defined processing temperature; and at least one temperature sensor that is configured to determine one or more actual temperature values of the workpiece, wherein:

the at least one temperature sensor is configured to generate temperature data based on the determined actual temperature values and to provide the temperature data to the control unit;

the control unit is configured to calculate actual dimensions of the workpiece based on the nominal dimension data and on the provided temperature data; and the control unit is configured to control the actuators to process the workpiece according to the calculated actual dimensions, the machine tool comprises one or more fixations configured to fix a position and orientation of the workpiece on the base;

the machine parameters comprise information about the fixations;

the nominal data comprises one or more expansion coefficients of the workpiece; and the control unit is configured to calculate the actual dimensions of the workpiece also based on the expansion coefficients of the workpiece and on the information about the fixations.

2. The machine tool according to claim 1, wherein the control unit is configured to determine deformations and/or internal stresses in the workpiece due to the fixed position and orientation of the workpiece on the base and to calculate the actual dimensions of the workpiece also based on the determined deformations and/or internal stresses.

3. The machine tool according to claim 1, wherein the control unit is configured to calculate the actual dimensions of the workpiece also based on machine temperature data generated based on one or more determined actual temperature values of one or more parts of the machine tool, wherein:

the at least one temperature sensor is configured to determine the one or more actual temperature values of the one or more parts of the machine tool, to generate the machine temperature data and to provide the machine temperature data to the control unit; and/or the machine tool comprises at least one additional temperature sensor, wherein the at least one additional temperature sensor is configured to determine the one or more actual temperature values of the one or more parts of the machine tool, to generate the machine temperature data and to provide the machine temperature data to the control unit, the one or more parts of the machine tool include the one or more fixations and/or comprise one or more specific points at or near the one or more fixations.

4. The machine tool according to claim 1, wherein the information about the fixations comprises one or more expansion coefficients of the fixations, and the control unit is configured to calculate the actual dimensions of the workpiece also based on the expansion coefficients of the fixations.

5. The machine tool according to claim 1, wherein calculating the actual dimensions of the workpiece comprises:

obtaining processing point coordinates of one or more processing points on the workpiece to be approached and processed by the processing means;

identifying, in a numerical simulation model of the workpiece, one or more neighbouring nodes for each of the one or more processing points;

determining a node-based displacement vector for each neighbouring node; and applying, to each of the one or more processing points, the node-based displacement vector of the neighbouring node having the shortest distance to the processing point, or an interpolated displacement vector calculated from the node-based displacement vectors of a plurality of neighbouring nodes, to generate temperature correction information for each of the one or more processing points, wherein the temperature correction information comprises temperature-corrected three-dimensional coordinates.

6. The machine tool according to claim 5, wherein:

controlling the actuators to process the workpiece according to the calculated actual dimensions comprises correcting three-dimensional coordinates of the one or more processing points;

determining the node-based displacement vector comprises using a numerical temperature simulation to calculate a thermal expansion value for a difference between the pre-defined temperature and one or more actual temperatures using a Nastran analysis; and/or identifying the neighbouring node for each of the one or more processing points is based on the plurality of actual temperature values of the workpiece or on an actual temperature distribution on at least a part of the workpiece.

7. The machine tool according to claim 1, wherein controlling the actuators to process the workpiece comprises controlling the actuators to move the processing means along a processing path according to the nominal data;

the control unit is configured to generate a modified processing path for the processing means based on the calculated actual dimensions of the workpiece; and controlling the actuators to process the workpiece according to the calculated actual dimensions comprises controlling the actuators to move the processing means along the modified processing path.

8. The machine tool according to claim 1, wherein the at least one temperature sensor is a thermal imaging temperature sensor that is configured:

to be directed to the object or to a working volume of the machine tool, and to generate the temperature data in the form of one or more thermal images, wherein the control unit is configured to generate the modified processing path based on the thermal images, wherein the thermal imaging temperature sensor is movable relative to the base; and/or configured to determine the actual temperature values continuously and to generate a plurality of sets of temperature data based on the continuously determined actual temperature values, wherein each set of temperature data is referenced to a position of the processing means.

9. The machine tool according to claim 1, wherein the at least one temperature sensor is configured:

to determine the actual temperature values continuously and to generate a plurality of sets of temperature data based on the continuously determined actual temperature values, wherein each set of temperature data is provided to the computing device in real time and/or together with a time-stamp; and/or to determine the actual temperature values synchronously with a processing of the workpiece, wherein a modified processing path is generated dynamically while the processing means is moved along the modified processing path.

10. The machine tool according to claim 1, comprising a contacting temperature sensor configured to approach and contact surface points of the workpiece to measure a temperature at each of the surface points and to generate contact temperature values for each of the surface points.

11. The machine tool according to claim 10, wherein:

the control unit is configured to adjust the temperature data from the at least one temperature sensor using the contact temperature values;

the contacting temperature sensor is included in a tactile stylus; and/or the plurality of processing points comprises the plurality of surface points.

12. The machine tool according to claim 10, wherein:

the at least one temperature sensor is configured to determine the one or more actual temperature values of the workpiece by means of infrared measurement; and the contact temperature values for the surface points are used to calibrate or correct the one or more actual temperature values of the workpiece measured by the at least one temperature sensor.

13. The machine tool according to claim 12, wherein:

the surface points are defined for determining an emissivity of the related surface, wherein defining the surface points comprises detecting reflective surfaces on the workpiece using the nominal dimension data, material information of the workpiece and/or the temperature data from the one or more thermal imaging temperature sensor; and/or the at least one temperature sensor is configured to move relative to the workpiece while determining one or more actual temperature values of the same surface of the workpiece by means of infrared measurement, and the computing device is configured to determine an emissivity and/or a reflectivity of said surface and to correct, based on the determined emissivity and/or reflectivity, one or more actual temperature values on said surface using the contact temperature values.

14. A computer-implemented method for processing a workpiece that has a temperature which deviates from a pre-defined processing temperature using a machine tool, the method comprising:

obtaining nominal data of the workpiece, the nominal data comprising nominal dimension data providing nominal dimensions of the workpiece at the pre-defined processing temperature;

determining one or more actual temperature values of the workpiece, calculating actual dimensions of the workpiece based on the nominal dimension data and on the provided temperature data; and processing the workpiece according to the calculated actual dimensions, wherein:

a position and orientation of the workpiece is fixed on a base of the machine tool by means of one or more fixations;

the nominal data comprises one or more expansion coefficients of the workpiece; and the actual dimensions of the workpiece are calculated also based on the expansion coefficients of the workpiece and on information about the fixations.

15. The method according to claim 14, wherein:

the method further comprises determining deformations and/or internal stresses in the workpiece due to the fixed position and orientation of the workpiece on the base, wherein the actual dimensions of the workpiece are calculated also based on the determined deformations and/or internal stresses; and/or the information about the fixations comprises one or more expansion coefficients of the fixations, wherein the actual dimensions of the workpiece are calculated also based on the expansion coefficients of the fixations.

16. The method according to claim 14, wherein calculating the actual dimensions of the workpiece comprises:

obtaining processing point coordinates of one or more processing points on the workpiece to be approached and processed by processing means of the machine tool;

identifying, in a numerical simulation model of the workpiece, one or more neighbouring nodes for each of the one or more processing points;

determining a node-based displacement vector for each neighbouring node; and applying, to each of the one or more processing points, the node-based displacement vector of the neighbouring node having the shortest distance to the processing point, or an interpolated displacement vector calculated from the node-based displacement vectors of a plurality of neighbouring nodes, to generate temperature correction information for each of the one or more processing points.

17. The method according to claim 16, wherein the temperature correction information comprises temperature-corrected three-dimensional coordinates;

calculating the actual dimensions of the workpiece comprises correcting three-dimensional coordinates of the one or more processing points;

determining the node-based displacement vector comprises using a numerical temperature simulation to calculate a thermal expansion value for a difference between the pre-defined temperature and one or more actual temperatures using a Nastran analysis; and/or identifying the neighbouring node for each of the one or more processing points is based on the plurality of actual temperature values of the workpiece, or on an actual temperature distribution on at least a part of the workpiece.

18. A non-transitory computer-readable medium comprising computer-executable instructions comprising programme code which is stored on the non-transitory machine-readable medium, and performing the computer-executable instructions, when executed on a control unit of a machine, the method according to claim 14.

19. A non-transitory computer-readable medium comprising computer-executable instructions comprising programme code which is stored on the non-transitory machine-readable medium, and performing the computer-executable instructions, when executed on a control unit of a machine, the method according to claim 17.

\* \* \* \* \*